(12) United States Patent
Sohn et al.

(10) Patent No.: US 10,289,933 B2
(45) Date of Patent: May 14, 2019

(54) METHOD AND DEVICE FOR TRANSFORMING 2D IMAGE INTO 3D

(71) Applicant: INDUSTRY-ACADEMIC COOPERATION FOUNDATION, YONSEI UNIVERSITY, Seoul (KR)

(72) Inventors: Kwang Hoon Sohn, Seoul (KR); Sun Ok Kim, Seoul (KR)

(73) Assignee: INDUSTRY-ACADEMIC COOPERATION FOUNDATION, YONSEI UNIVERSITY, Seoul (KR)

( * ) Notice: Subject to any disclaimer, the term of this patent is extended or adjusted under 35 U.S.C. 154(b) by 172 days.

(21) Appl. No.: 15/246,419

(22) Filed: Aug. 24, 2016

(65) Prior Publication Data

US 2017/0061247 A1   Mar. 2, 2017

(30) Foreign Application Priority Data

Aug. 28, 2015 (KR) ........................ 10-2015-0121772

(51) Int. Cl.
*G06K 9/62* (2006.01)
*H04N 13/00* (2018.01)
*G06T 15/20* (2011.01)
*G06T 7/00* (2017.01)
*H04N 13/172* (2018.01)
(Continued)

(52) U.S. Cl.
CPC ......... *G06K 9/6255* (2013.01); *G06K 9/4652* (2013.01); *G06K 9/4676* (2013.01); *G06T 7/529* (2017.01); *H04N 13/172* (2018.05); *H04N 13/178* (2018.05); *H04N 13/257* (2018.05);
(Continued)

(58) Field of Classification Search
None
See application file for complete search history.

(56) References Cited

U.S. PATENT DOCUMENTS 8,054,170 B1 * 11/2011 Brandt ................. G06K 9/4676
340/453
2015/0063681 A1   3/2015 Bhardwaj et al.
(Continued)

OTHER PUBLICATIONS

Kook-Yeol Yoon et al., An Approach for Local Around Indoor Corridors Based on Visual Attention Model, Journal of Institute of Control, Robotics and Systems 2011 17(2):93-101 (with English Abstract).
(Continued)

*Primary Examiner* — Iman K Kholdebarin

(57) ABSTRACT

A method and device for transforming 2D images into 3D are disclosed. The disclosed device includes a dictionary storage unit configured to store a word-depth gradient dictionary; a color patch obtainer unit configured to obtain color patches from an input image; a matching word search unit configured to transform each of the color patches obtained by the color patch obtainer unit into a SIFT descriptor form and search for words closest to the SIFT descriptors of the obtained color patches from among the words of the word-depth gradient dictionary; a matching depth gradient obtainer unit configured to obtain depth gradient information of the words matching the obtained color patches from the word-depth gradient dictionary; and a depth map generation unit configured to compute a depth from the obtained matching depth gradient for each of the obtained color patches and generate a depth map.

9 Claims, 6 Drawing Sheets

(51) Int. Cl.
 *G06K 9/46* (2006.01)
 *G06T 7/529* (2017.01)
 *H04N 13/257* (2018.01)
 *H04N 13/271* (2018.01)
 *H04N 13/261* (2018.01)
 *H04N 13/178* (2018.01)
(52) U.S. Cl.
 CPC ......... *H04N 13/261* (2018.05); *H04N 13/271* (2018.05); *G06T 2207/20081* (2013.01)

(56) References Cited

U.S. PATENT DOCUMENTS

2017/0061247 A1* 3/2017 Sohn ...................... G06T 7/529
2018/0144182 A1* 5/2018 El-Zehiry .......... G01N 15/1463

OTHER PUBLICATIONS

June-Hyeok Hong et al., Human Action Recognition in Still Image Using Weighted Bag-of-Features and Ensemble Decision Trees; The Journal of the Korean Institute of Communication Sciences 2013 1, 1-9, Korea Institute of Communication Sciences (with English Abstract).
Hyunjon Jeong et al., Image Categorization Using SIFT Bag of Word; Dept. of Computer Science & Engineering, Sogang University, pp. 1277-1279 (with English Abstract).

\* cited by examiner

METHOD AND DEVICE FOR TRANSFORMING 2D IMAGE INTO 3D

CROSS-REFERENCE TO RELATED APPLICATIONS

This application claims the benefit of Korean Patent Application No. 10-2015-0121772, filed with the Korean Intellectual Property Office on Aug. 28, 2015, the disclosure of which is incorporated herein by reference in its entirety.

BACKGROUND

1. Technical Field

The present invention relates to an image transformation device, more particularly to a method and device for transforming 2D images into 3D.

2. Description of the Related Art

With advances in communications and image processing technology, various forms of media contents are being produced. 3D contents are no exception, and a great amount of activity can be seen in the production of 3D contents. A 3D content is generally obtained using a separate camera, such as a stereoscopic camera, that is capable of acquiring depth information for an image. A content obtained with a regular camera does not provide the depth information for the image and thus cannot be displayed in a 3D form.

With increasing demands for 3D contents, there is now also a demand for 3D incarnations of existing contents that were previously produced in a 2D form. As such, there has been continuous research on methods for transforming an existing 2D image into a 3D image.

Since a 2D image does not include depth information, the depth information has to be inferred from the 2D image. Research efforts have thus been focused on ways to infer depth information.

Existing research for inferring depth information from a 2D image has mainly utilized a method of pre-storing considerable amounts of reference images and then inferring the depth information by searching for a reference image that has a similar color set as that of the inputted image.

As this approach entails individually analyzing a considerable amount of reference images, the processing speed can be very slow, and a considerably large amount of memory capacity may be required.

SUMMARY OF THE INVENTION

An aspect of the invention provides as method and device with which a 2D image can be transformed into 3D at a high speed.

Also, an aspect of the invention provides a method and device with which a 2D image can be transformed into 3D using a relatively small memory capacity.

One aspect of the invention provides a device for transforming a 2D image rum 3D. This device may include: a dictionary storage unit configured to store a word-depth gradient dictionary, in which are recorded words having the form of SIFT descriptors and depth gradient information relating to each of the words; a color patch obtainer unit configured to obtain color patches from an input image; a matching word search unit configured to transform each of the color patches obtained by the color patch obtainer unit into a SIFT descriptor form and search for words closest to the SIFT descriptors of the obtained color patches from among the words of the word-depth gradient dictionary; a matching depth gradient obtainer unit configured to obtain depth gradient information of the words matching the obtained color patches from the word-depth gradient dictionary; and a depth map generation unit configured to compute a depth from the obtained matching depth gradient for each of the obtained color patches and generate a depth map.

The word-depth gradient dictionary may be generated by way of a training process performed on training images.

The device may further include an edge detection unit configured to detect an edge area of the input image, and the color patch obtainer unit may obtain the color patches from an edge area detected by the edge detection unit.

The words of the word-depth gradient dictionary may be selected from resultant data resulting from transforming color patches obtained from training images into SIFT descriptors.

The words may be selected from clusters after performing clustering on the resultant data resulting from transforming the color patches obtained from the training images into SIFT descriptors.

The words may be SIFT descriptors positioned at the centers of the clusters.

Another aspect of the invention provides a method for transforming a 2D image into 3D. This method may include: (a) storing a word-depth gradient dictionary, in which are recorded words having a SIFT descriptor form and depth gradient information relating to each of the words; (b) obtaining color patches from an input image; (c) transforming each of the color patches obtained by step (b) into a SIFT descriptor form and searching for words closest to the SIFT descriptors of the obtained color patches from among the words of the word-depth gradient dictionary; (d) obtaining depth gradient information of the words matching the obtained color patches from the word-depth gradient dictionary; and (e) generating a depth map by computing a depth from the obtained matching depth gradient for each in the obtained color patches.

An embodiment of the invention can provide the advantage allowing transformations of 2D images into 3D with high speed and relatively small memory capacity.

Additional aspects and advantages of the present invention will be set forth in part in the description which follows, and in part will be obvious from the description, or may be learned by practice of the invention.

DETAILED DESCRIPTION OF THE INVENTION

Figure 1:
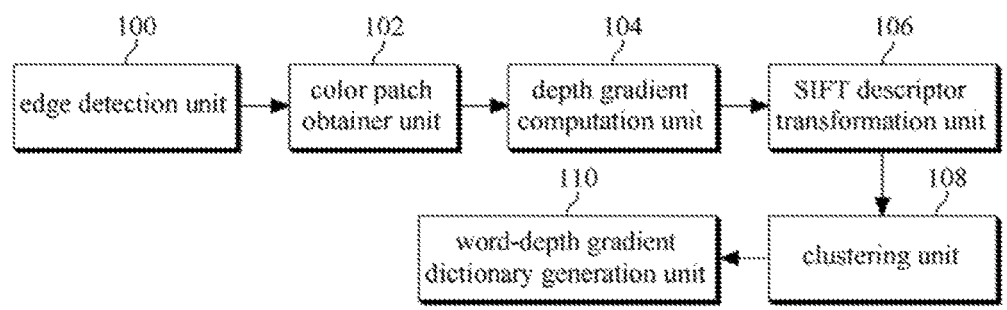
FIG. 1 illustrates a training device for generating word-depth gradient resources to be used in transforming a 2D image into a 3D image.

Certain embodiments of the invention are described below with reference to the accompanying drawings. It should be appreciated, however, that the present invention can be implemented in a variety of different forms and as such is not to be limited to the embodiments described herein.

For a clearer understanding of the overall invention, portions in the drawings having little relevance to the descriptions may have been omitted, and like reference numerals are used for like elements throughout the entirety of the specification.

Throughout the specification, the description that a portion is "connected to" another portion is intended to encompass not only those cases where the portions are "directly connected" but also those cases where the portions are "indirectly connected", i.e. with one or more other members positioned in-between.

Also, when a portion is described as "including" a certain element, this description should not be interpreted, as meaning that other elements are excluded but rather as meaning other elements can further be included, unless it is clearly stated to the contrary.

A detailed description of certain embodiments of the present invention is provided below with reference to the accompanying drawings.

FIG. 1 is a block diagram illustrating the structure of a training device that first performs a training process prior to transforming a 2D image into 3D according to an embodiment of the invention.

A device for transforming a 2D image into 3D according to an embodiment of the invention may generate a word-depth gradient dictionary through a training process, obtain a depth map from an inputted 2D image by using the word-depth gradient dictionary thus generated, and use the depth map to perform a 3D transformation.

The training device illustrated in FIG. 1 is a device for generating the word-depth gradient that will be used in transforming a 2D image into 3D. The training device may use training images as input.

A multiple number of training images may be inputted to the training device, and by using the data obtained from the multiple training images, a word-depth gradient dictionary having an adequate level of confidence may be generated.

A description on the specific data structure of the word-depth gradient dictionary will be provided together with a description of the training device illustrated in FIG. 1.

Referring to FIG. 1, a training device according to an embodiment of the invention may include an edge detection unit 100, as color patch obtainer unit 102, a depth gradient computation unit 104, a SIFT descriptor transformation unit 106, a clustering unit 108, and a word-depth gradient dictionary generation unit 110.

A training device according to an embodiment of the invention may be inputted with training images, and the edge detection unit 100 may serve to detect the edges from inputted training images. The edge detection may be performed for each inputted training image. The inputted training images may be images for which the depth information is already known.

The edge detection unit 100 may detect the edges, which correspond to the boundary areas of the images, by using any of various known methods. The specific method of detecting edges is not elaborated herein, since various edge detection methods are already known, and an such edge detection method can be used.

The color patch obtainer unit 102 may obtain color patches from the inputted training images based on the edge information of the edge detection unit 100. A color patch is a patch occupying a small area in an inputted training image, where the size of the color patch may be determined beforehand.

A color patch may be obtained from an area where an edge is formed within the input image, and finding the area where an edge is formed may utilize the edge information detected at the edge detection unit 100.

The number of color patches obtained from one input image can be determined beforehand, or alternatively, the number of color patches can be flexibly adjusted based on the amount of edges detected instead of being pre-determined.

The depth gradient computation unit 104 may compute the depth gradient of the color patches obtained from the training images.

As the depth information of the training images is already known, this known depth information may be used to compute the depth gradient, which relates to the amount of change of depth, for each patch. The depth gradient relates to the amount of change of the depth, and by using the obtained color patches, the change in depth at the edge areas may be computed. The computing of the depth gradient involves typical computations, and as such, the specific method of computing the depth gradient is not elaborated herein.

The depth gradient computation unit 104 may perform a depth gradient computation for each color patch obtained by the color patch obtainer unit 102, to ultimately generate depth gradient pair information for each color patch.

Figure 2:
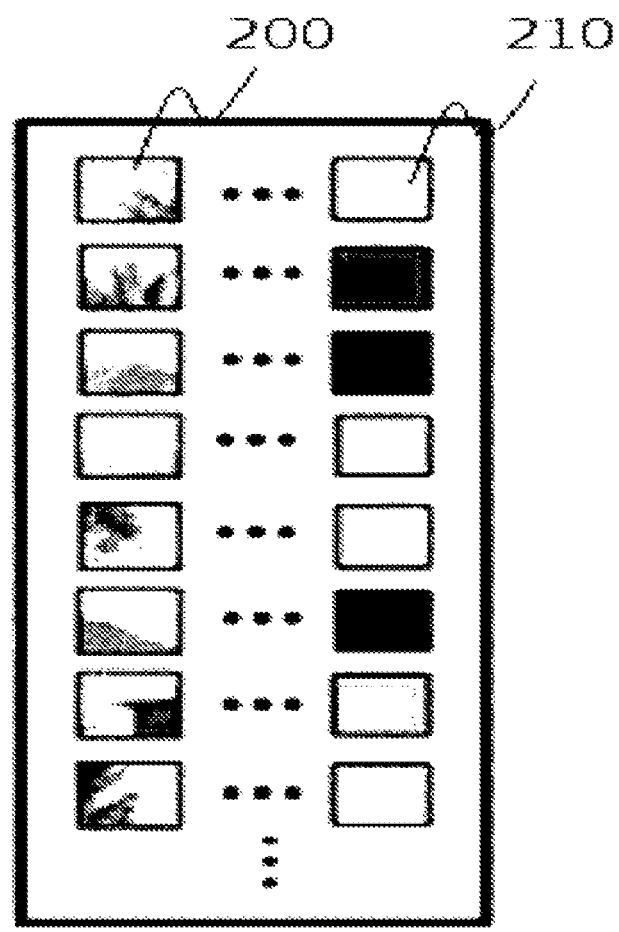
FIG. 2 illustrates examples of color patch-depth gradient pairs generated during a training process according to an embodiment of the invention.

FIG. 2 illustrates examples of color patch depth gradient pairs generated during a training process according to an embodiment of the invention.

FIG. 2 illustrates pairs of color patches 200 and the depth gradient computation results 210 of the respective color patches. The color patches 200 and their corresponding depth gradient computation results 210 may be temporarily stored in a storage unit (not shown) of the training device to be used in generating the word-depth gradient dictionary.

The SIFT (Scale Invariant Feature Transform) descriptor transformation unit 106 may transform a color patch 200 into a SIFT descriptor. The SIFT is a known method image transformation method, where a SIFT descriptor represents the resultant data resulting from a SIFT transformation on a color patch 200.

Transforming the color patches into the form of SIFT descriptors is for performing clustering on the color patches. With just a color patches 200 itself, it is difficult to compute its similarity or perform clustering based on similarity. Therefore, an embodiment of the invention may have the color patches transformed into SIFT descriptors. Of course, the skilled person would easily understand that a transformation into any of various other forms of descriptors that allow clustering, other than the SIFT descriptor, is also possible.

The clustering unit 108 may perform clustering on the color patches transformed into SIFT descriptors. Here, clustering represents grouping the color patches, which have been transformed into SIFT descriptors, into a multiple number of clusters. For examples, the multiple number of color patches may be grouped into a multiple number of clusters, such as to a first cluster, a second cluster, etc.

Figure 3:
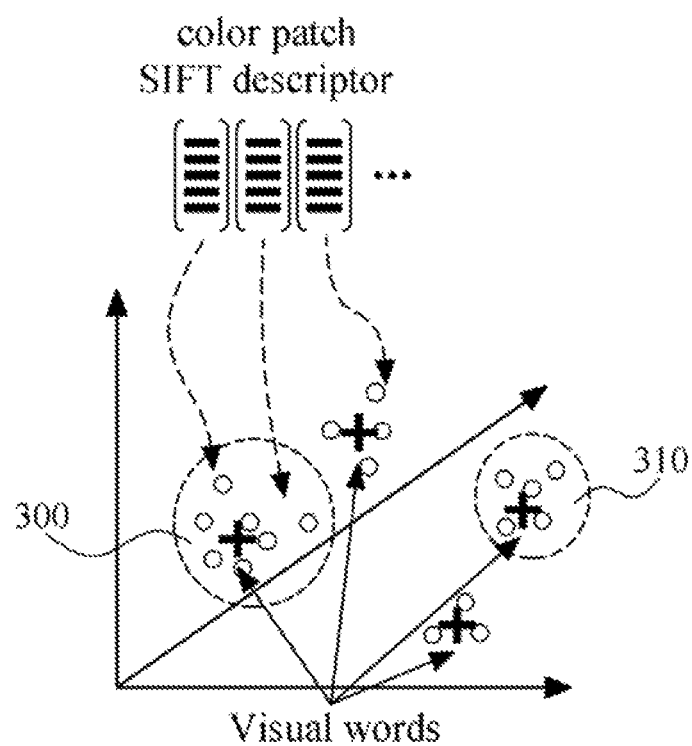
FIG. 3 illustrates an example of a clustering of color patches that have been transformed into SIFT descriptors according to an embodiment of the invention.

FIG. 3 illustrates an example of a clustering, of color patches that have been transformed into SIFT descriptors according to an embodiment of the invention.

FIG. 3 shows color patches that have been transformed into SIFT descriptors arranged in a SIFT descriptor space. While FIG. 3 is illustrated as if the SIFT descriptors are arranged in 2D space, this is merely for illustrative purposes, and actual SIFT descriptors would be multi-dimensional data rather than 2-dimensional.

With the clustering, adjacent SIFT descriptors from among the SIFT descriptors of the SIFT space may form a cluster.

FIG. 3 shows a first cluster 300 arranged in a first space, and a second cluster 310 arranged in a second space.

When clustering is achieved for SIFT descriptors located in adjacent spaces, the cluster information may be stored in a separate storage unit.

The word-depth gradient dictionary generation unit 110, using the multiple number of clusters formed by the clustering unit 108, may generate a word-depth gradient dictionary that will be used in the 2D to 3D transformation.

In the word-depth gradient dictionary, a word represents a color patch selected as a representative color patch from among the color patches (color patches that have been transformed into the form of SIFT descriptors) included in each cluster generated during the training process.

The word-depth gradient dictionary generation unit 110 may select a representative color patch from among the color patches (color patches that have been transformed into the form of SIFT descriptors) included in each cluster.

In an embodiment of the invention, K-means clustering may be used to choose the color patch positioned at the center of a cluster as a representative color patch.

For example, the representative color patches can be selected from the multiple color patches (color patches that have been transformed into a SIFT descriptor form) included in the clusters such that the following formula yields the lowest result.

$$\sum_{i=1}^{K} \sum_{f \in C_i} \|f - u_i\|^2 \qquad \text{[Formula 1]}$$

In Formula 1 above, K is the number of clusters, f represents SIFT descriptors (color patches) belonging to the i-th cluster $C_i$, and $u_i$ represents a representative color patch (which becomes a word in the generated word-depth gradient dictionary).

Figure 4:
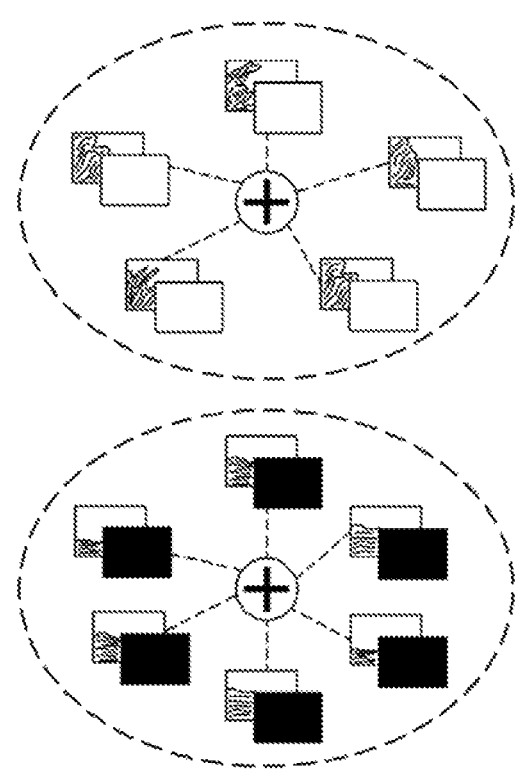
FIG. 4 illustrates an example of choosing representative color patches from clusters according to an embodiment of the invention.

FIG. 4 illustrates an example of choosing representative color patches from clusters according to an embodiment of the invention.

FIG. 4 shows an example in which the color patch positioned at the center portion, from among the multiple number of patches, is selected as a representative color patch.

The depth gradient corresponding to the representative color patch (word) chosen in each cluster may be obtained by using the average of all depth gradients included in the cluster. That is, the average of all of the depth gradients included in a particular cluster may be computed, with the computed average determined to be the depth gradient corresponding to the representative color patch (word) that has been transformed into the form of a SIFT descriptor.

Such process for determining a word by choosing a representative color patch, as well as the process for computing the corresponding depth gradient may be performed for each of the clusters.

The word-depth gradient dictionary may comprise the pairs of representative color patches (words) for the respective clusters and their corresponding depth gradients, so that the word-depth gradient dictionary can be expressed as Formula 2 shown below.

$$D = \{\{u_i, v_i\} | i=1,2, \ldots K\} \qquad \text{[Formula 2]}$$

In Formula 2 above, $u_i$ represents the representative color patch of the i-th cluster, and $v_i$ represents the depth gradient of the i-th cluster, and K represents the number of clusters.

Figure 5:
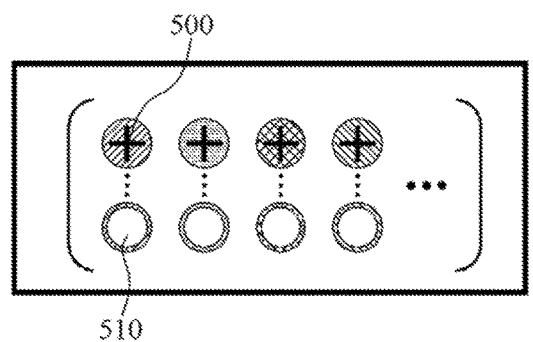
FIG. 5 illustrates an example of a word-depth gradient dictionary according to an embodiment of the invention.

FIG. 5 illustrates an example of a word-depth gradient dictionary according to an embodiment of the invention.

FIG. 5 shows representative color patches (words) 500 and their corresponding depth gradients 510. Such a dictionary composed of color patch and depth gradient pairs can be used to transform a 2D image into 3D.

Figure 6:
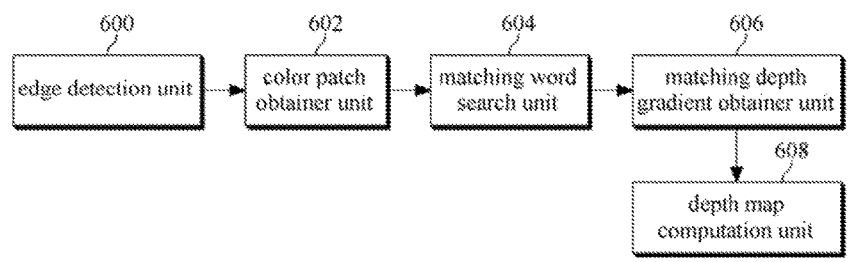
FIG. 6 is a block diagram illustrating the structure of a device for transforming a 2D image into 3D according to an embodiment of the invention.

FIG. 6 is a block diagram illustrating the structure of a device for transforming a 2D image into 3D according to an embodiment of the invention.

Referring to FIG. 6, a device for transforming a 2D image into 3D according to an embodiment of the invention may include an edge detection unit 600, a color patch obtainer unit 602, a matching word search unit 604, a matching depth gradient obtainer unit 606, and a depth map computation unit 608.

A device for transforming a 2D image into 3D according to an embodiment of the invention may be provided with an input image of which the depth information is unknown, and the edge detection unit 600 may detect the edges of the input image.

The color patch obtainer unit 602 may obtain color patches from the edge areas detected by the edge detection unit 600. The size of the color patches may be the same as the color patch size corresponding to the words in a pre-equipped word-depth gradient dictionary.

The color patch obtainer unit 602 may obtain color patches from all of the edge areas for which the depth information is required.

When the color patches are obtained from the color patch obtainer unit 602, the matching word search unit 604 may search for words corresponding to the obtained color patches from the pre-stored word-depth gradient dictionary, to find the words most closely matching the color patches.

To search for the matching words, the obtained color patches may be transformed into SIFT descriptors. The degree of similarity may be analyzed between the SIFT descriptors transformed from the obtained color patches and the words of the word-depth gradient dictionary, and subsequently, the most similar words may be determined to be the words corresponding to the obtained color patches.

A word matching an obtained color patch can be expressed as Formula 3 shown below.

$$k = \arg\min_i \|f_p - u_i\|^2 \qquad \text{[Formula 3]}$$

In Formula 3 above, $f_p$ is the value of the SIFT descriptor to which an obtained color patch is transformed, $u_i$ is a word of the word-depth gradient dictionary, and k is the word matching the color patch and selected from the dictionary.

The procedure for searching a matching word from the obtained color patch may be performed for all of the color patches.

The matching depth gradient obtainer unit 606 may obtain the depth gradient associated with the selected word by reading it from the dictionary.

The depth map computation unit 608 may compute the depth of each color patch by using the depth gradient corresponding to the obtained color patch and may compute a depth map for the input image by using the depth information computed for each color patch.

According to an embodiment of the invention, the depth map can be computed by using a Poisson Solver and post-processing.

This transformation of a 2D image into 3D using a word-depth gradient dictionary according to an embodiment of the invention provides the advantage that the 2D image can be transformed into a 3D image with a considerably smaller amount of data compared to existing data-based approaches.

Also, since the color patches are obtained and the depth information is computed only for edge areas, and since the area occupied by edges in the overall image is not large, the image transformation can be performed at a higher speed.

Figure 7:
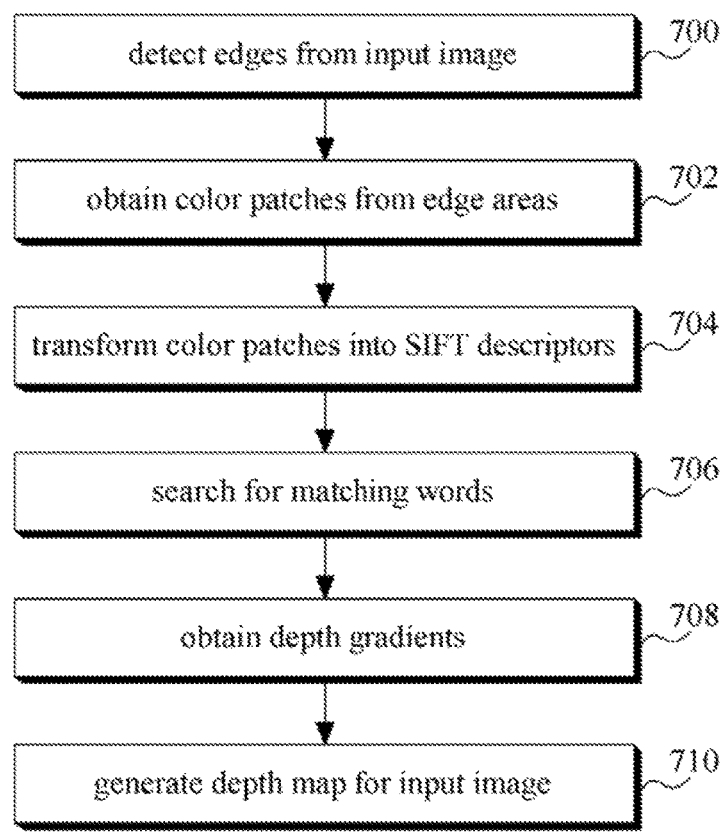
FIG. 7 is a flowchart illustrating the overall flow of a method for transforming a 2D image into 3D according to an embodiment of the invention.

FIG. 7 is a flowchart illustrating the overall flow of a method for transforming a 2D image into 3D according to an embodiment of the invention.

Referring to FIG. 7, the edges may first be detected from the input image (step 700).

When the edge detection is performed, color patches may be obtained from the detected edge areas (step 702). The color patches may be obtained from throughout the edge areas, and the color patches are not Obtained from locations that are not edge areas. The number of color patches obtained can be determined based on the size of an edge area.

When the color patches are obtained from the input image, each of the obtained color patches may be transformed into a SIFT descriptor (step 704).

When the color patches are transformed into the form of SIFT descriptors, words matching the color patches transformed into a SIFT descriptor form may be searched from the depth gradient dictionary (step 706).

Since the words also have the form of SIFT descriptors, a typical difference operation may be used to search for words that are closest to the color patches.

When the words matching the obtained color patches are searched, the depth gradients corresponding to the searched words may be read from the word-depth gradient dictionary, and the depth gradients thus read may be determined as the depth gradients corresponding to the obtained color patches (step 708).

When the depth gradients are obtained for the obtained color patches, respectively, the depth gradients may be used to compute the depth information for each color patch, and a depth map may be generated for the input image based on the depth information of each color patch. Using the depth map thus generated, the inputted 2D image may be transformed into a 3D image.

The embodiments of the present invention described above are for illustrative purposes only, and those having ordinary skill in the field of art to which the present invention pertains would understand that other detailed implementations can be readily provided without departing from the technical spirit or essential features of the invention.

Therefore, the embodiments described above are in all aspects merely illustrative and do not limit the present invention.

For example, an element referred to as a single unit can be implemented in a dispersed form, and likewise, an element referred to as a dispersed form can be implemented in a unified form.

The scope of the present invention is defined by the scope of claims set forth below, and should be interpreted as encompassing all variations or modifications that can be derived from the meaning and scope of the elements in the claims as well as their equivalents.

What is claimed is:

1. A device for transforming a 2D image into 3D, the device comprising:
   a processor; and
   a memory storing one or more programs configured to be executed by the processor, the one or more programs comprising instructions for:
   (a) storing a word-depth gradient dictionary, the word-depth dictionary having recorded therein words having a SIFT descriptor form and depth gradient information relating to each of the words;
   (b) obtaining a plurality of color patches from an input image;
   (c) transforming each of the plurality of color patches obtained by said step (b) into a SIFT descriptor form and searching for words closest to the SIFT descriptors of the obtained color patches from among the words of the word-depth gradient dictionary;
   (d) obtaining depth gradient information of the words matching the obtained color patches from the word-depth gradient dictionary; and
   (e) generating a depth map by computing a depth from the obtained matching depth gradient for each of the obtained color patches, wherein said step (d) comprises a step of detecting an edge area of the input image and said (d) obtains the color patches from the detected edge area.

2. The device for transforming a 2D image into 3D according to claim 1, wherein the word-depth gradient dictionary is generated by way of a training process performed on a plurality of training images.

3. The device for transforming a 2D image into 3D according to claim 1, wherein the words of the word-depth gradient dictionary are selected from resultant data resulting from transforming color patches obtained from training images into SIFT descriptors.

4. The device for transforming a 2D image into 3D according to claim 3, wherein the words are selected from clusters after performing clustering on the resultant data resulting from transforming the color patches obtained from the training images into SIFT descriptors.

5. The device for transforming a 2D image into 3D according to claim 4, wherein the words are SIFT descriptors positioned at centers of the clusters.

6. A method for transforming a 2D image into 3D, the method comprising:
   (a) storing a word-depth gradient dictionary, the word-depth gradient dictionary having recorded therein words having a SIFT descriptor form and depth gradient information relating to each of the words;
   (b) obtaining a plurality of color patches from an input image;
   (c) transforming each of the plurality of color patches obtained by said step (b) into a SIFT descriptor form and searching for words closest to the SIFT descriptors of the obtained color patches from among the words of the word-depth gradient dictionary;

(d) obtaining depth gradient information of the words matching the obtained color patches from the word-depth gradient dictionary; and (e) generating a depth map by computing a depth from the obtained matching depth gradient for each of the obtained color patches, wherein said step (d) comprises a step of detecting an edge area of the input image and said step (d) obtains the color patches from the detected edge area.

7. The method for transforming a 2D image into 3D according to claim 6, wherein the word-depth gradient dictionary is generated by way of a training process performed on a plurality of training images.

8. The method for transforming a 2D image into 3D according to claim 6, wherein the words are selected from clusters after performing clustering on the resultant data resulting from transforming the color patches obtained from the training images into SIFT descriptors.

9. The method for transforming a 2D image into 3D according to claim 8, wherein the words are SIFT descriptors positioned at centers of the clusters.

\* \* \* \* \*